United States Patent
Liu et al.

(10) Patent No.: US 11,749,811 B2
(45) Date of Patent: Sep. 5, 2023

(54) IONICALLY CONDUCTIVE ASYMMETRIC COMPOSITE MEMBRANE FOR ELECTROCHEMICAL ENERGY SYSTEM APPLICATIONS

(71) Applicant: UOP LLC, Des Plaines, IL (US)

(72) Inventors: Chunqing Liu, Arlington Heights, IL (US); Xueliang Dong, Schaumburg, IL (US); Chaoyi Ba, Schaumburg, IL (US); Stuart R. Miller, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 203 days.

(21) Appl. No.: 17/388,950

(22) Filed: Jul. 29, 2021

(65) Prior Publication Data

US 2022/0311017 A1 Sep. 29, 2022

Related U.S. Application Data

(60) Provisional application No. 63/165,777, filed on Mar. 25, 2021.

(51) Int. Cl.
*H01M 8/02* (2016.01)
*H01M 8/18* (2006.01)

(52) U.S. Cl.
CPC .............. *H01M 8/02* (2013.01); *H01M 8/188* (2013.01)

(58) Field of Classification Search
CPC ......... H01M 8/02–0267; H01M 8/1016–1093; H01M 8/18–20
See application file for complete search history.

(56) References Cited

U.S. PATENT DOCUMENTS

| | | |
|---|---|---|
| 3,790,610 A | 2/1974 | Lum et al. |
| 4,167,214 A | 9/1979 | Street, Jr. |
| 4,873,037 A | 10/1989 | Chau et al. |
| 6,468,688 B2 | 10/2002 | Kazacos et al. |
| 9,865,895 B2 | 1/2018 | Evans et al. |
| 10,586,996 B2 | 3/2020 | Evans et al. |
| 2009/0274955 A1 | 11/2009 | Kikuchi et al. |
| 2014/0057154 A1 | 2/2014 | Timmons |
| 2014/0370404 A1* | 12/2014 | Kato ............... H01M 8/1058 429/418 |
| 2018/0065105 A1* | 3/2018 | Song ............... B01J 20/28085 |
| 2019/0067725 A1 | 2/2019 | Wainright et al. |
| 2019/0326578 A1 | 10/2019 | Frischmann et al. |
| 2020/0052317 A1 | 2/2020 | Song |

FOREIGN PATENT DOCUMENTS

| | | |
|---|---|---|
| EP | 2590250 A1 | 5/2013 |
| EP | 2800192 A1 | 11/2014 |
| RU | 2406612 C2 | 8/2008 |
| WO | 2007010878 A1 | 1/2007 |
| WO | 2016132249 A1 | 8/2016 |
| WO | 2019118662 A1 | 6/2019 |
| WO | 2019135710 A1 | 7/2019 |

OTHER PUBLICATIONS

International Search Report from corresponding PCT application No. PCT/US2021/072185 dated Feb. 10, 2022.
Written Opinion from corresponding PCT application No. PCT/US2021/072185 dated Feb. 10, 2022.
International Search Report from PCT application No. PCT/US2021/072181 dated Feb. 17, 2022.
Written Opinion from PCT application No. PCT/US2021/072181 dated Feb. 17, 2022.
Yensen, Nicholas et al, Open source all-iron batter for renewable energy storage, HardwareX 6 (2019).
Tucker, Michael C. et al., All-Iron Redox Flow Battery Tailored for Off-Grid Portable Applications, ChemSusChem 8 (23) Dec. 1, 2015.
Zhang, Hongzhang et al., Nanofiltration (NF) membranes: the next generation separators for all vanadium redox flow batteries (VRBs)?, Energy Environ.Sci., 2011, 4, 1676.
Teng, Xiangguo et al., Nafion/organically modified silicate hybrids membrane for vanadium redox flow battery, Journal of Power Sources 189 (2009), 1240-1246.
Chieng, S.C. et al., Modification of Daramic, microporous separator, for redox flow battery applications, Journal of Membrane Science, 75 (1992) 81-91.
Wei, Xiaoliang et al., Micropourous separators for Fe/V redox flow batteries, Journal of Power Sources 218 (2012) 39-45.
Gubler, Lorenz, Membranes and separators for redox flow batteries, Current Opinion in Electrochemistry 2019, 18:31-36.
Mohammadi, T. et al., Use of polyelectrolyte for incorporation of ion-exchange groups in composite membranes for vanadium redox flow battery application, Journal of Power Sources 56 (1995) 91-96.
Mohammadi, T. et al., Evaluation of the chemical stability of some membranes in vanadium solution, Journal of Applied Electrochemistry 27 (1997) 153-160.
Ding, Cong et al., Vanadium Flow Battery for Energy Storage: Prospects and Challenges, The Journal of Physical Chemistry Letters, 2013, 4, 1281-1294.
Varco, John R. et al., Anion-exchange membranes in electrochemical energy systems, Energy Environ. Sci., 2014, 7, 3135-3191.
Shi, Yu et al, Recent development of membrane for vanadium redox flow battery applications: A review, Applied Energy 238 (2019) 202-224.

(Continued)

*Primary Examiner* — Eugenia Wang

(57) ABSTRACT

An ionically conductive asymmetric composite membrane for use in redox flow battery, fuel cell, electrolysis applications and the like is described. It comprises a microporous substrate membrane and an asymmetric hydrophilic ionomeric polymer coating layer on the surface of the microporous substrate layer. The coating layer is made of a hydrophilic ionomeric polymer. The asymmetric hydrophilic ionomeric polymer coating layer comprises a porous layer having a first surface and a second surface, the first surface of the porous layer on the surface of the microporous substrate layer and a nonporous layer on the second surface of the porous support layer. The microporous substrate membrane is made from a different polymer from the hydrophilic ionomeric polymer.

20 Claims, No Drawings

(56) References Cited

OTHER PUBLICATIONS

Zhang, Hongzhang et al., Silica modified nanofiltration membranes with improved selectivity for redox flow battery application, Energy Environ. Sci, 2012, 5, 6299.
Mohammadi, T. et al., Use of polyelectrolyte for incorporation if ion-exchange groups in composite membranes for vanadium redox flow battery applications, Journal of Power Sources 56 (1995) 91-96.
Modiba, Portia et al., Electrochemical impedance spectroscopy of Ce(IV) with aminopolycarboxylate ligands for redox flow batteries applications, Journal of Power Sources 205 (2012) 1-9.

* cited by examiner

IONICALLY CONDUCTIVE ASYMMETRIC COMPOSITE MEMBRANE FOR ELECTROCHEMICAL ENERGY SYSTEM APPLICATIONS

RELATED APPLICATIONS

This application claims the benefit of U.S. Provisional Patent Application Ser. No. 63/165,777 filed Mar. 25, 2021, the entirety of which is incorporated herein by reference.

BACKGROUND OF THE INVENTION

Energy storage systems have played a key role in harvesting energy from various sources. These energy storage systems can be used to store energy and convert it for use in many different applications, such as building, transportation, utility, and industry. A variety of energy storage systems have been used commercially, and new systems are currently being developed. Energy storage systems can be categorized as electrochemical and battery, thermal, thermochemical, flywheel, compressed air, pumped hydropower, magnetic, biological, chemical, and hydrogen energy storage. The development of cost-effective and eco-friendly energy storage systems is needed to solve the energy crisis and to overcome the mismatch between generation and end use.

Renewable energy sources, such as wind and solar power, have transient characteristics because they depend on environmental conditions and therefore require associated energy storage. Renewable energy storage systems such as redox flow batteries (RFBs) have attracted significant attention for electricity grid, electric vehicles, and other large-scale stationary applications. RFB is an electrochemical energy storage system that reversibly converts chemical energy directly to electricity. The conversion of electricity via water electrolysis into hydrogen as an energy carrier without generation of carbon monoxide or carbon dioxide as byproducts enables a coupling of the electricity, chemical, mobility, and heating sectors. Hydrogen as an energy vector for grid balancing or power-to-gas and power-to-liquid processes plays an important role in the path toward a low-carbon energy structure that is environmentally friendly. Water electrolysis produces high quality hydrogen by electrochemical splitting of water into hydrogen and oxygen; the reaction is given by Equation 1 below. The water electrolysis process is an endothermic process, and electricity is the energy source. Water electrolysis has zero carbon footprint when the process is operated by renewable power sources, such as wind, solar, or geothermal energy. The main water electrolysis technologies include alkaline electrolysis, proton exchange membrane (PEM) electrolysis, anion exchange membrane (AEM) electrolysis, and solid oxide electrolysis. In the PEM water electrolysis system, an anode and a cathode are separated by a solid PEM electrolyte such as a sulfonated tetrafluoroethylene based fluoropolymer copolymer sold under the trademark Nafion® by Chemours Company. The anode and cathode catalysts typically comprise $IrO_2$ and Pt, respectively. At the positively charged anode, pure water is oxidized to produce oxygen gas, electrons (e), and protons; the reaction is given by Equation 2. The protons are transported from the anode to the cathode through the PEM which conducts protons. At the negatively charged cathode, a reduction reaction takes place with electrons from the cathode being given to protons to form hydrogen gas; the reaction is given by Equation 3. The PEM not only conducts protons from the anode to the cathode, but also separates the $H_2$ and $O_2$ produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (about 20 to about 90° C.) operation, and high purity oxygen byproduct. However, one of the major challenges for PEM water electrolysis is the high capital cost of the cell stack which includes acid-tolerant stack hardware, noble metal catalysts required for the electrodes, and the PEM, all of which are expensive.

$$\text{Water electrolysis reaction}: 2H_2O \rightarrow 2H_2 + O_2 \quad (1)$$

$$\text{Oxidation reaction at anode}: 2H_2O \rightarrow O_2 + 4H^+ + 4e^- \quad (2)$$

$$\text{Reduction reaction at cathode}: 2H^+ + 2e^- \rightarrow H_2 \quad (3)$$

Fuel cells, as a next generation clean energy resource, convert the energy of chemical reactions, such as an oxidation/reduction redox reaction of hydrogen and oxygen, into electric energy. Three main types of fuel cells are alkaline electrolyte fuel cells, polymer electrolyte membrane fuel cells, and solid oxide fuel cells. Polymer electrolyte membrane fuel cells may include proton exchange membrane fuel cells (PEMFC), anion exchange membrane fuel cells (AEMFC), and direct methanol fuel cells.

The anode in an electrochemical cell is the electrode at which the predominant reaction is oxidation (e.g., the water oxidation/oxygen evolution reaction electrode for a water or $CO_2$ electrolyzer, or the hydrogen oxidation electrode for a fuel cell).

RFBs are composed of two external storage tanks filled with active materials comprising metal ions that may be in different valance states, two circulation pumps, and a flow cell with a separation membrane. The separation membrane is located between the anode and the cathode and is used to separate the anolyte and the catholyte, as well as to utilize the current circuit by allowing the transfer of balancing ions. The anolyte, catholyte, anode, and cathode may also be referred to as plating electrolyte or negative electrolyte, redox electrolyte or positive electrolyte, plating electrode or negative electrode, and redox electrode or positive electrode respectively. Among all the redox flow batteries developed to date, all vanadium redox flow batteries (VRFB) have been the most extensively studied. VRFB uses the same vanadium element in both half cells which prevents crossover contamination of electrolytes from one half cell to the other half cell. VRFB, however, is inherently expensive due to the use of high-cost vanadium and an expensive membrane. All-iron redox flow batteries (IFB) are particularly attractive for grid scale storage applications due to the use of low cost and abundantly available iron, salt, and water as the electrolyte and the non-toxic nature of the system. IFBs have iron in different valence states as both the positive and negative electrolytes for the positive and negative electrodes, respectively. The iron-based positive and negative electrolyte solutions stored in the external storage tanks flow through the stacks of the batteries. The cathode side half-cell reaction involves $Fe^{2+}$ losing electrons to form $Fe^{3+}$ during charge and $Fe^{3+}$ gaining electrons to form $Fe^{2+}$ during discharge; the reaction is given by Equation 4. The anode side half-cell reaction involves the deposition and dissolution of iron in the form of a solid plate; the reaction is given by Equation 5. The overall reaction is shown in Equation 6.

$$\text{Redox electrode}: 2Fe^{2+} \leftrightarrow Fe^{3+} 2e^- + 0.77V \quad (4)$$

$$\text{Plating electrode}: Fe^{2+} + 2e^- \leftrightarrow Fe^0 - 0.44V \quad (5)$$

$$\text{Total}: 3Fe^{2+} \leftrightarrow Fe^0 + 2Fe^{3+} 1.21V \quad (6)$$

The membrane is one of the key materials that make up a battery or electrolysis cell and is an important driver for safety and performance. Some important properties for membranes for flow batteries, fuel cells, and membrane electrolysis include high conductivity, high ionic permeability (porosity, pore size and pore size distribution), high ionic exchange capacity (for ion-exchange membrane), high ionic/electrolyte selectivity (low permeability/crossover to electrolytes), low price (less than $150-200/m$^2$), low area resistance to minimize efficiency loss resulting from ohmic polarization, high resistance to oxidizing and reducing conditions, chemically inert to a wide pH range, high thermal stability together with high proton conductivity (greater than or equal to 120° C. for fuel cell), high proton conductivity at high T without $H_2O$, high proton conductivity at high T with maintained high RH, and high mechanical strength (thickness, low swelling).

The two main types of membranes for redox flow battery, fuel cell, and electrolysis applications are polymeric ion-exchange membranes and microporous separators. The polymeric ion-exchange membranes can be cation-exchange membranes comprising $-SO_3^-$, $-COO^-$, $-PO_3^{2-}$, $-PO_3H^-$, or $-C_6H_4O$ cation exchange functional groups, anion-exchange membranes comprising $-NH_3^+$, $-NRH_2^+$, $-NR_2H^+$, $-NR_3^+$, or $-SR_2^-$ anion exchange functional groups, or bipolar membranes comprising both cation-exchange and anion-exchange polymers. The polymers for the preparation of ion-exchange membranes can be perfluorinated ionomers such as Nafion®, Flemion®, and NEO-SEPTA®-F, partially fluorinated polymers, non-fluorinated hydrocarbon polymers, non-fluorinated polymers with aromatic backbone, or acid-base blends. In general, perfluorosulfonic acid (PFSA)-based membranes, such as Nafion® and Flemion®, are used in vanadium redox flow battery (VRFB) systems due to their oxidation stability, good ion conductivity, unique morphology, mechanical strength, and high electrochemical performance. However, these membranes have low balancing ions/electrolyte metal ion selectivity, and high electrolyte metal ion crossover which causes capacity decay in VRFBs, and they are expensive.

The microporous and nanoporous membrane separators can be inert microporous/nanoporous polymeric membrane separators, inert non-woven porous films, or polymer/inorganic material coated/impregnated separators. The inert microporous/nanoporous polymeric membrane separators can be microporous polyethylene (PE), polypropylene (PP), PE/PP, or composite inorganic/PE/PP membrane, inert non-woven porous films, non-woven PE, PP, polyamide (PA), polytetrafluoroethylene (PTFE), polyvinyl chloride (PVC), polyvinylidene fluoride (PVDF), polyethylene terephalate (PET), or polyester porous film. For example, microporous Daramic® and Celgard® membrane separators made from PE, PP, or blends of PE and PP polymers are commercially available. They normally have high ionic conductivity, but also high electrolyte cross-over for RFB applications.

Therefore, there is a need for stable, high performance (low gas crossover and excellent conductivity), low-cost membrane for redox flow battery applications to improve voltage efficiency (VE), coulombic efficiency (CE), and energy efficiency (EE) of the redox flow batteries, for fuel cells, and for electrolysis applications.

DESCRIPTION OF THE INVENTION

U.S. Provisional Patent Application No. 63/109,683 disclosed a new type of low cost, high performance, ionically conductive thin film composite (TFC) membrane comprising a hydrophilic ionomeric polymer coated TFC membrane for energy storage applications such as redox flow battery, fuel cell, and electrolysis applications. The hydrophilic ionomeric polymer coating layer is a dense nonporous layer.

A new type of ionically conductive asymmetric composite membrane has been developed which can be used in redox flow battery, fuel cell, and electrolysis applications. It is an ionically conductive asymmetric composite membrane which improves the performance of a redox flow battery, fuel cell, or electrolysis system.

The ionically conductive asymmetric composite membrane comprises a microporous substrate membrane and an asymmetric hydrophilic ionomeric polymer coating layer on the surface of the microporous substrate layer. The coating layer is made of a hydrophilic ionomeric polymer. The asymmetric hydrophilic ionomeric polymer coating layer comprises a porous layer having a first surface and a second surface, the first surface of the porous layer on the surface of the microporous substrate layer and a nonporous layer on the second surface of the porous support layer. The microporous substrate membrane is made from a different polymer from the hydrophilic ionomeric polymer. The nonporous layer is dense, such that it will conduct a proton, supporting electrolyte cations such as $NH_4^+$ or $K_+$, but rejecting electrolyte cations, such as $Fe^{2+}$ or $Fe^{3+}$, and it is selective for $H^+/Fe^{2+}$ or $Fe^{3+}$. The thickness of the nonporous layer is in a range of about 10 nanometers to about 5 micrometers, or in a range of about 30 nanometers to about 2 micrometers, or in a range of about 30 nanometers to about 1 micrometer. The nonporous layer and the porous support layer may be made of the same or different hydrophilic ionomeric polymers. The asymmetric hydrophilic ionomeric polymer coating layer and the microporous substrate membrane are formed from different polymers. The hydrophilic ionomeric polymer can also be present in the micropores of the microporous substrate membrane.

The asymmetric hydrophilic ionomeric polymer coating layer is ionically conductive. The ionic conductivity means that the asymmetric hydrophilic ionomeric polymer coating layer can transport the charge-carrying ions, such as protons or ammonium ion ($NH_4^+$), from one side of the membrane to the other side of the membrane to maintain the electric circuit. The electrical balance is achieved by the transport of charge-carrying ions (such as protons, ammonium ions, potassium ions, or sodium ions in all iron redox flow battery system) in the electrolytes across the asymmetric composite membrane during the operation of the battery cell. The ionic conductivity ($\sigma$) of the asymmetric composite membrane is a measure of its ability to conduct charge-carrying ions, and the measurement unit for conductivity is Siemens per meter (S/m). The ionic conductivity ($\sigma$) of the ionically conductive asymmetric composite membrane is measured by determining the resistance (R) of the membrane between two electrodes separated by a fixed distance. The resistance is determined by electrochemical impedance spectroscopy (EIS) and the measurement unit for the resistance is Ohm ($\Omega$). The membrane area specific resistance (RA) is the product of the resistance of the membrane (R) and the membrane active area (A) and the measurement unit for the membrane area specific resistance is ($\Omega \cdot cm^2$). The membrane ionic conductivity ($\sigma$, S/cm) is proportional to the membrane thickness (L, cm) and inversely proportional to the membrane area specific resistance (RA, $\Omega \cdot cm^2$).

The performance of the ionically conductive asymmetric composite membrane for RFB applications is evaluated by several parameters including membrane solubility and stability in the electrolytes, area specific resistance, numbers of battery charge/discharge cycling, electrolyte crossover through the membrane, voltage efficiency (VE), coulombic efficiency (CE), and energy efficiency (EE) of the RFB cell. CE is the ratio of a cell's discharge capacity divided by its charge capacity. A higher CE, indicating a lower capacity loss, is mainly due to the lower rate of crossover of electrolyte ions, such as ferric and ferrous ions, in the iron redox flow battery system. VE is defined as the ratio of a cell's mean discharge voltage divided by its mean charge voltage (See M. Skyllas-Kazacos, C. Menictas, and T Lim, Chapter 12 on Redox Flow Batteries for Medium- to Large-Scale Energy Storage in *Electricity Transmission, Distribution and Storage Systems*, A volume in Woodhead Publishing Series in Energy; 2013). A higher VE, indicating a higher ionic conductivity, is mainly due to the low area specific resistance of the membrane. EE is the product of VE and CE and is an indicator of energy loss in charge-discharge processes. EE is a key parameter to evaluate an energy storage system.

The incorporation of the asymmetric hydrophilic ionomeric polymer coating layer into the ionically conductive membrane provides a new type of ionically conductive asymmetric composite membrane that integrates a size-exclusion ion-conducting separation mechanism derived from the hydrophilic property of the hydrophilic ionomeric polymer with an ion-exchange ion-conducting separation mechanism derived from the ionomeric property of the polymer. The asymmetric membrane morphology with the nonporous layer on top of the porous layer can improve ionic conductivity and selectivity. The ionically conductive asymmetric composite membrane exhibits improved performance compared to traditional thick nonporous polymeric ion-exchange membranes without asymmetric membrane morphologies having thicknesses of about 10 nanometers to about 5 micrometers, as well as microporous membrane separators for energy storage applications such as for redox flow battery applications. The ionically conductive composite membrane shows excellent membrane stability in the electrolytes, low area specific resistance, high numbers of battery charge/discharge cycles, low electrolyte crossover through the membrane, high VE, CE, and EE for redox flow battery applications.

The hydrophilic ionomeric polymer on the ionically conductive asymmetric composite membrane is a polysaccharide polymer, a poly(acrylic acid) polymer, a poly(methacrylic acid) polymer, or combinations thereof. The polysaccharide polymer used in the current invention can be selected from, but is not limited to, chitosan, alginic acid, carrageenic acid, hyaluronic acid, dextran, pullulan, carboxymethyl curdlan, carboxymethyl cellulose, pectic acid, chitin, chondroitin, xanthan gum, or combinations thereof. The hydrophilic ionomeric polymer contains high water affinity polar functional groups such as —OH, —NH$_2$, —O—, —COOH, —SO$_3$H or charged functional groups such as —SO$_3^-$, —COO$^-$ or —NH$_3^+$ group. The hydrophilic ionomeric polymer not only has high stability in an aqueous electrolyte solution due to its insolubility in the aqueous electrolyte solution, but also has high affinity to water and charge-carrying ions such as H$_3$O$^+$ or NH$_4^+$ due to the hydrophilicity and ionomeric property of the polymer and therefore high ionic conductivity and low membrane specific area resistance.

In some embodiments, the hydrophilic ionomeric polymer is alginic acid, hyaluronic acid, carrageenic acid, or combinations thereof.

The asymmetric hydrophilic ionomeric polymer coating layer of the ionically conductive asymmetric composite membrane comprises a nonporous layer on top of a porous support layer (i.e., the nonporous layer is on the opposite side of the porous layer than the microporous substrate membrane). The nonporous layer and the porous support layer may be made of the same or different hydrophilic ionomeric polymers. The nonporous layer has a thickness typically in the range of about 10 nanometers to about 5 micrometers, or in a range of about 30 nanometers to about 2 micrometers, or in a range of about 30 nanometers to about 1 micrometer. The nonporous layer has no pores or has very small nanochannels with a pore size less than 0.5 nm in the presence of liquid water or water vapor, which results in high selectivity of charge-carrying ions such as protons, hydrated protons, potassium ions, hydrated potassium ions, ammonium ions, hydrated ammonium ions, sodium ions, and hydrated sodium ions over the electrolytes such as ferric ions, hydrated ferric ions, ferrous ions, and hydrated ferrous ions. The porous support layer has a thickness typically in the range of about 1 micrometer to about 100 micrometers, or in a range of about 2 micrometers to about 50 micrometers, or in a range of about 5 micrometers to about 15 micrometer.

The microporous substrate membrane should have good thermal stability (be stable up to at least 100° C.), high aqueous and organic solution resistance (be insoluble in aqueous and organic solutions) under low pH condition (e.g., pH less than 6), high resistance to oxidizing and reducing conditions (be insoluble and have no performance drop under oxidizing and reducing conditions), high mechanical strength (no dimensional change under the system operation conditions), as well as other factors dictated by the operating conditions for energy storage applications. The microporous substrate membrane must be compatible with the cell chemistry and meet the mechanical demands of cell stacking or winding assembly operations. The microporous substrate membrane has high ionic conductivity, but low selectivity of charge-carrying ions such as protons, hydrated protons, chloride ions, potassium ions, hydrated potassium ions, sodium ions, and hydrated sodium ions over the electrolytes such as ferric ions, hydrated ferric ions, ferrous ions, and hydrated ferrous ions.

The polymers suitable for the preparation of the microporous substrate membrane can be selected from, but not limited to, polyolefins such as polyethylene and polypropylene, polyamide such as Nylon 6 and Nylon 6,6, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, polybenzimidazole, polyimide, polyvinylidene fluoride, polycarbonate, cellulose, or combinations thereof.

These polymers provide a range of desirable properties, such as low cost, high stability in water and electrolytes under a wide range of pH, good mechanical stability, and ease of processability for membrane fabrication.

The microporous substrate membrane can have either a symmetric porous structure or an asymmetric porous structure. The asymmetric microporous substrate membrane can be formed by a phase inversion membrane fabrication approach followed by direct air drying, or by phase inversion followed by solvent exchange methods. The microporous substrate membrane also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the micropores. The wet processing of thermoplastic polyolefins may be done with the aid of a hydrocarbon liquid or low molecular weight oil mixed with the polymer resin or a mixture of the polymer resin and inorganic nanoparticles in the melt phase. The melt mixture is extruded through a die similar to the dry processed separators. The thickness of the microporous substrate membrane can be in a range of 10-1000 micrometers, or a range of 10-900 micrometers, or a range of 10-800 micrometers, or a range of 10-700 micrometers, or a range of 10-600 micrometers, or a range of 10-500 micrometers, or a range of 20-500 micrometers. The pore size of the microporous substrate membrane can be in a range of 10 nanometers to 50 micrometers, or a range of 50 nanometers to 10 micrometers, or a range of 0.2 micrometers to 1 micrometer.

Another aspect of the invention are methods of making the asymmetric composite membrane. In one embodiment, the method comprises applying a layer of an aqueous solution comprising a water-soluble hydrophilic ionomeric polymer to one surface of a microporous substrate membrane; drying the coated membrane to form an ionically conductive composite membrane comprising a nonporous water-soluble hydrophilic ionomeric polymer coating layer on the microporous substrate membrane; and converting the nonporous water-soluble hydrophilic ionomeric polymer coating layer into an asymmetric hydrophilic ionomeric polymer coating layer comprising a nonporous layer on top (i.e., the side opposite the microporous substrate membrane) of a porous support layer. The nonporous water-soluble hydrophilic ionomeric polymer coating layer is converted into the asymmetric hydrophilic ionomeric polymer coating layer comprising a nonporous layer on top of a porous support layer by simultaneously exposing the nonporous water-soluble hydrophilic ionomeric polymer coating layer side to a positive electrolyte solution having a pH of 1.5 or lower and exposing the microporous substrate membrane side to a negative electrolyte solution having a pH greater than or equal to the pH of the positive electrolyte solution.

In some embodiments, the coated membrane is dried for a time in a range of 5 min to 5 h, or 5 min to 4 h, or 5 min to 3 h, or 10 min to 2 h, or 30 min to 1 h at a temperature in a range of 40° C. to 100° C., or 40° C. to 80° C., or 55° C. to 65° C.

In some embodiments, the nonporous water-soluble hydrophilic ionomeric polymer coating layer side is exposed to the positive electrolyte solution and the microporous substrate membrane side is exposed to the negative electrolyte solution simultaneously for 10 min to 10 h, or 30 min to 6 h, or 1 h to 4 h at 10° C. to 60° C., or 20° C. to 50° C., or 20° C. to 30° C.

In some embodiments, the aqueous solution comprising a water-soluble hydrophilic ionomeric polymer may also comprise an inorganic or organic acid. The inorganic acid can be selected from, but is not limited to, HCl, $H_2SO_4$, or $H_3PO_4$. The organic acid can be selected from, but is not limited to, acetic acid or lactic acid. In some embodiments, the hydrophilic ionomeric polymer is a negatively charged polysaccharide polymer, a positively charged polysaccharide polymer, or combinations thereof. The charged polysaccharides refer to polysaccharides that carry charged groups in the molecules, which include both negatively and positively charged polysaccharides. The positively charged polysaccharides may carry positively charged groups such as $—NH_3^+$, $—NRH_2^+$, $—NR_2H^+$, or $—NR_3^+$. The negatively charged polysaccharides may carry negatively charged groups such as $—COO^-$, $—SO_3^-$, $—PO_3^{2-}$, $—PO_3H^-$, or $—C_6H_4O^-$. The charged groups help with the solubility of polysaccharides, which is achieved by increasing the molecular affinity to water and preventing the intermolecular association due to the electrostatic effects posed by the charged group.

In some embodiments, the negatively charged polysaccharide polymer comprises sodium alginate, potassium alginate, calcium alginate, ammonium alginate, sodium hyaluronate, potassium hyaluronate, calcium hyaluronate, ammonium hyaluronate, κ-carrageenan, λ-carrageenan, τ-carrageenan, pectin, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, or combinations thereof.

In some embodiments, the positively charged polysaccharide polymer is protonated chitosan.

In some embodiments, the water-soluble hydrophilic ionomeric polymer is a poly(acrylic acid) polymer, a poly(methacrylic acid) polymer, or combinations thereof.

In some embodiments, the positive electrolyte solution with a pH of 1.5 or lower comprises water, a first amino acid such as glycine, an inorganic acid such as HCl, an iron precursor such as $FeCl_2$ or a combination of $FeCl_2$ and $FeCl_3$, a supporting electrolyte such as $NH_4Cl$ or KCl, and optionally a boric acid.

In some embodiments, the negative electrolyte solution with a pH greater than or equal to the pH of the positive electrolyte solution comprises water, an iron precursor such as $FeCl_2$ or a combination of $FeCl_2$ and $FeCl_3$, a supporting electrolyte such as $NH_4Cl$ or KCl, and a negative electrolyte additive such as boric acid or a mixture of boric acid and glycine.

Another aspect of the invention is a redox flow battery system. In one embodiment, the redox flow battery system comprises: at least one rechargeable cell comprising a positive electrolyte, a negative electrolyte, and an ionically conductive asymmetric composite membrane positioned between the positive electrolyte and the negative electrolyte, the positive electrolyte in contact with a positive electrode, and the negative electrolyte in contact with a negative electrode, wherein the ionically conductive asymmetric composite membrane comprises a hydrophilic ionomeric polymer coating layer and a microporous substrate membrane, wherein the asymmetric hydrophilic ionomeric polymer coating layer comprises a nonporous layer on top of a porous support layer, wherein the nonporous layer and the porous support layer have the same or different hydrophilic ionomeric polymer, and wherein the asymmetric hydrophilic ionomeric polymer coating layer and the microporous substrate membrane are formed from different polymers.

Suitable hydrophilic ionomeric polymers in the ionically conductive asymmetric composite membrane in the redox flow battery system include, but are not limited to, a poly(acrylic acid) polymer, a poly(methacrylic acid) polymer, various types of polysaccharide polymers such as chitosan, alginic acid, hyaluronic acid, dextran, pullulan, carboxymethyl curdlan, carrageenic acid, carboxymethyl cellulose acid, pectic acid, chitin, chondroitin, xanthan gum, or combinations thereof.

In some embodiment, the negative electrolyte, the positive electrolyte, or both the negative electrolyte and the positive electrolyte comprises a boric acid additive.

In some embodiment, the negative electrolyte, the positive electrolyte, or both the negative electrolyte and the positive electrolyte comprises ferrous chloride.

In some embodiment, the positive electrolyte comprises ferrous chloride and hydrochloric acid.

In some embodiment, the positive electrolyte comprises ferrous chloride, ferric chloride, and hydrochloric acid.

In some embodiment, the positive electrolyte and the negative electrolyte have the same composition.

In some embodiment, the positive electrolyte consists essentially of $FeCl_2$ at a concentration of 1.0-4.5 M, $NH_4Cl$ at a concentration of 1.0-4.0 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M.

In some embodiment, the positive electrolyte consists essentially of $FeCl_2$ at a concentration of 1.0-4.5 M, KCl at a concentration of 1.0-3.0 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M.

In some embodiment, the negative electrolyte consists essentially of $FeCl_2$ at a concentration of 1.0-4.5 M, $NH_4Cl$ at a concentration of 1.0-4.0 M, optionally boric acid at a concentration of 0.01-1.0 M, optionally glycine at a concentration of 0.01-3.0 M, and optionally $FeCl_3$ at a concentration of 0.1-1.0 M.

In some embodiment, the negative electrolyte consists essentially of $FeCl_2$ at a concentration of 1.0-4.5 M, KCl at a concentration of 1.0-3.0 M, optionally boric acid at a concentration of 0.01-1.0 M, optionally glycine at a concentration of 0.01-3.0 M, and optionally $FeCl_3$ at a concentration of 0.1-1.0 M.

In some embodiment, the hydrophilic ionomeric polymer in the redox flow battery system comprises alginic acid, hyaluronic acid, carrageenic acid, chitosan, pectinic acid, pectic acid, carboxymethyl curdlan, carboxymethyl cellulose acid, dextran, pullulan, chitin, chondroitin, xanthan gum, or combinations thereof.

EXAMPLES

Comparative Example 1: Preparation of Alginic Acid/Daramic® Composite Membrane Comprising a Thick Nonporous Alginic Acid Coating Layer (Abbreviated as AA-D)

A 6.5 wt % sodium alginate aqueous solution was prepared by dissolving sodium alginate polymer in DI water. One surface of a Daramic® microporous support membrane purchased from Daramic, LLC was coated with a thin layer of the 6.5 wt % sodium alginate aqueous solution and dried at 60° C. for 2 h in an oven to form a nonporous sodium alginate layer with a thickness of about 5-6 micrometers on the surface of the Daramic® substrate membrane. The dried membrane was treated with a 1.0 M hydrochloric acid aqueous solution for 30 min to convert the thick nonporous sodium alginate coating layer to a thick nonporous alginic acid coating layer to form AA-D membrane.

Example 1: Preparation of Asymmetric Alginic Acid/Daramic® Composite Membrane Comprising a Nonporous Alginic Acid Layer and a Porous Alginic Acid Layer by Treating the Membrane in Electrolyte Solutions Comprising $FeCl_2$ and $NH_4Cl$ (Abbreviated Asymmetric AA-D-N)

A 6.5 wt % sodium alginate aqueous solution was prepared by dissolving sodium alginate polymer in DI water. One surface of a Daramic® microporous support membrane purchased from Daramic, LLC was coated with a thin layer of the 6.5 wt % sodium alginate aqueous solution and dried at 60° C. for 2 h in an oven to form a nonporous sodium alginate layer with a thickness of about 5-6 micrometers on the surface of the Daramic® substrate membrane. The dried membrane was installed in a cell comprising a positive electrolyte solution having $FeCl_2$, $NH_4Cl$, glycine, boric acid, and HCl with a pH of 0.7 and a negative electrolyte solution having $FeCl_2$, $NH_4Cl$, glycine, boric acid, and HCl with a pH of 1.7. The nonporous sodium alginate coating layer side of the membrane was exposed to the positive electrolyte solution and the porous Daramic® substrate membrane side of the membrane was exposed to the negative electrolyte solution. Both the positive and negative electrolyte solutions were circulated using two pumps for 2 h. The positive and negative electrolyte solution treatment resulted in the formation of an asymmetric AA-D-N alginic acid/Daramic® composite membrane comprising a thin layer of dense nonporous alginic acid layer and a porous alginic acid support layer on top of the porous Daramic® substrate membrane.

Example 2: Preparation of Asymmetric Alginic Acid/Daramic® Composite Membrane Comprising a Nonporous Alginic Acid Layer and a Porous Alginic Acid Layer by Treating the Membrane in Electrolyte Solutions Comprising $FeCl_2$ and KCl (Abbreviated Asymmetric AA-D-K)

A 6.5 wt % sodium alginate aqueous solution was prepared by dissolving sodium alginate polymer in DI water. One surface of a Daramic® microporous support membrane purchased from Daramic, LLC was coated with a thin layer of the 6.5 wt % sodium alginate aqueous solution and dried at 60° C. for 2 h in an oven to form a nonporous sodium alginate layer with a thickness of about 5-6 micrometers on the surface of the Daramic® substrate membrane. The dried membrane was installed in a cell comprising a positive electrolyte solution having $FeCl_2$, KCl, glycine, boric acid, and HCl with a pH of 0.7 and a negative electrolyte solution having $FeCl_2$, KCl, glycine, boric acid, and HCl with a pH of 1.7. The nonporous sodium alginate coating layer side of the membrane was exposed to the positive electrolyte solution and the porous Daramic® substrate membrane side of the membrane was exposed to the negative electrolyte solution. Both the positive and negative electrolyte solutions were circulated using two pumps for 2 h. The positive and negative electrolyte solution treatment resulted in the formation of an asymmetric AA-D-K alginic acid/Daramic® composite membrane comprising a thin layer of dense nonporous alginic acid layer and a porous alginic acid support layer on top of the porous Daramic® substrate membrane.

Example 3: All-Iron Redox Flow Battery Performance Study on Nafion® 115, AA-D, and Asymmetric AA-D-K Membranes The ionic conductivity, number of battery charge/discharge cycles, VE, CE, and EE of the commercial Nafion® 115 membrane, AA-D membrane as described in Comparative Example 1, and Asymmetric AA-D-K membrane as described in Example 2 were evaluated using an electrolyte formula comprising a positive electrolyte solution and a negative electrolyte solution. The positive electrolyte solution comprises 1.5 M $FeCl_2$, 2.0 M KCl, 0.2 M HCl, 0.1 M boric acid, and 0.2 M glycine in ultrapure water (18.2 MΩ·cm), and the pH of the solution was 0.7. The negative solution comprises 1.5 M $FeCl_2$, 2.0 M KCl, 0.08 M HCl, 0.1 M boric acid, and 0.2 M glycine in ultrapure water (18.2 MΩ·cm), and the pH of the solution was 1.7. The membrane performance was measured using EIS with a BCS-810 battery cycling system (Biologic, FRANCE) at room temperature, The results are shown in Table 1. It can be seen from Table 1 that the Asymmetric AA-D-K membrane showed lower area specific resistance, much longer battery cycles, and higher EE than the Nafion® 115 and AA-D membranes. This demonstrates that the Asymmetric AA-D-K membrane significantly improved the membrane performance compared to commercially available Nafion® 115 membranes and AA-D membrane with a thick nonporous alginic acid coating layer.

TABLE 1

All-Iron Redox Flow Battery Performance Measurements on Nafion ® 115, AA-D, and Asymmetric AA-D-K Membranes [a]

| Membrane | Area Specific Resistance (Ω · cm$^2$) | # Cycles | VE (%) | CE (%) | EE (%) |
|---|---|---|---|---|---|
| Nafion ® 117 | 6.25 | 28 | 51 | 81 | 41 |
| AA-D | 1.77 | 31 | 65 | 92 | 60 |
| Asymmetric AA-D-K | 1.26 | 40 | 72 | 90 | 65 |

[a] Charge current density: 30 mA/cm$^2$; charge time: 4 h; discharge current density: 30 mA/cm$^2$; discharge time: 4 h; # of cycles were counted with ≥70% CE.

Example 4: All-Iron Redox Flow Battery Performance Study on AA-D and Asymmetric AA-D-N Membranes The ionic conductivity, number of battery charge/discharge cycles, VE, CE, and EE of AA-D membrane as described in Comparative Example 1 and Asymmetric AA-D-N membrane as described in Example 1 were evaluated using an electrolyte formula comprising a positive electrolyte solution and a negative electrolyte solution. The positive electrolyte solution comprises 1.5 M $FeCl_2$, 3.5 M $NH_4Cl$, 0.2 M HCl, 0.1 M boric acid, and 0.2 M glycine in ultrapure water (18.2 MΩ·cm), and the pH of the solution was 0.7. The negative solution comprises 1.5 M $FeCl_2$, 3.5 M $NH_4Cl$, 0.06 M HCl, 0.1 M boric acid, and 0.2 M glycine in ultrapure water (18.2 MΩ·cm), and the pH of the solution was 1.7. The membrane performance was measured using EIS with a BCS-810 battery cycling system (Biologic, FRANCE) at room temperature, The results are shown in Table 2. It can be seen from Table 2 that the Asymmetric AA-D-N membrane showed lower area specific resistance, much longer battery cycles, and higher EE than AA-D membrane. This demonstrates that the Asymmetric AA-D-N membrane significantly improved the membrane performance compared to AA-D membrane with a thick nonporous alginic acid coating layer.

TABLE 2

All-Iron Redox Flow Battery Performance Measurements on AA-D and Asymmetric AA-D-N Membranes [a]

| Membrane | Area Specific Resistance (Ω · cm$^2$) | # Cycles | VE (%) | CE (%) | EE (%) |
|---|---|---|---|---|---|
| AA-D | 1.63 | 26 | 70 | 90 | 63 |
| Asymmetric AA-D-N | 1.35 | 36 | 71 | 96 | 68 |

[a] Charge current density: 30 mA/cm$^2$; charge time: 4 h; discharge current density: 30 mA/cm$^2$; discharge time: 4 h; # of cycles were counted with ≥70% CE.

Example 5: All-Iron Redox Flow Battery Performance Study on AA-D and Asymmetric AA-D-N Membranes The ionic conductivity, number of battery charge/discharge cycles, VE, CE, and EE of AA-D membrane as described in Comparative Example 1 and Asymmetric AA-D-N membrane as described in Example 1 were evaluated using an electrolyte formula comprising a positive electrolyte solution and a negative electrolyte solution. The positive electrolyte solution comprises 1.5 M $FeCl_2$, 3.5 M $NH_4Cl$, 0.4 M HCl, 0.1 M boric acid, and 0.4 M glycine in ultrapure water (18.2 MΩ·cm), and the pH of the solution was 0.4. The negative solution comprises 1.5 M $FeCl_2$, 3.5 M $NH_4Cl$, and 0.2 M boric acid in ultrapure water (18.2 MΩ·cm), and the pH of the solution was 1.6. The membrane performance was measured using EIS with a BCS-810 battery cycling system (Biologic, FRANCE) at room temperature, The results are shown in Table 3. It can be seen from Table 3 that the Asymmetric AA-D-N membrane showed lower area specific resistance, longer battery cycles, and higher EE than AA-D membrane. This demonstrates that the Asymmetric AA-D-N membrane significantly improved the membrane performance compared to AA-D membrane with a thick nonporous alginic acid coating layer.

TABLE 3

All-Iron Redox Flow Battery Performance Measurements on AA-D and Asymmetric AA-D-N Membranes [a]

| Membrane | Area Specific Resistance (Ω · cm$^2$) | # Cycles | VE (%) | CE (%) | EE (%) |
|---|---|---|---|---|---|
| AA-D | 1.55 | 34 | 68 | 94 | 64 |
| Asymmetric AA-D-N | 1.25 | 40 | 73 | 95 | 69 |

[a] Charge current density: 30 mA/cm$^2$; charge time: 4 h; discharge current density: 30 mA/cm$^2$; discharge time: 4 h; # of cycles were counted with ≥70% CE.

SPECIFIC EMBODIMENTS

While the following is described in conjunction with specific embodiments, it will be understood that this description is intended to illustrate and not limit the scope of the preceding description and the appended claims.

A first embodiment of the invention is an ionically conductive asymmetric composite membrane comprising a microporous substrate membrane; an asymmetric hydrophilic ionomeric polymer coating layer on a surface of the microporous substrate layer, the coating layer made of a hydrophilic ionomeric polymer, the coating layer comprising: a porous layer having a first surface and a second surface, the first surface of the porous layer on the surface of the microporous substrate layer; and a nonporous layer on the second surface of the porous layer; wherein the microporous substrate membrane is made from a polymer different from the hydrophilic ionomeric polymer. An embodiment of the invention is one, any or all of prior embodiments in this paragraph up through the first embodiment in this paragraph wherein the hydrophilic ionomeric polymer comprises a polysaccharide polymer, a poly(acrylic acid) polymer, a poly(methacrylic acid) polymer, or combinations thereof. An embodiment of the invention is one, any or all of prior embodiments in this paragraph up through the first embodiment in this paragraph wherein the hydrophilic ionomeric polymer comprises the polysaccharide polymer, and wherein the polysaccharide polymer comprises chitosan, alginic acid, hyaluronic acid, dextran, pullulan, carboxymethyl curdlan, carrageenic acid, carboxymethyl cellulose acid, pectic acid, chitin, chondroitin, xanthan gum, or combinations thereof. An embodiment of the invention is one, any or all of prior embodiments in this paragraph up through the first embodiment in this paragraph wherein the polysaccharide polymer comprises alginic acid, hyaluronic acid, carrageenic acid, chitosan, pectinic acid, pectic acid, carboxymethyl curdlan, carboxymethyl cellulose acid, dextran, pullulan, chitin, chondroitin, xanthan gum, or combinations thereof. An embodiment of the invention is one, any or all of prior embodiments in this paragraph up through the first embodiment in this paragraph wherein the microporous substrate membrane comprises polyethylene, polypropylene, polyamide, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, polybenzimidazole, polyimide, polyvinylidene fluoride, polycarbonate, cellulose, or combinations thereof. An embodiment of the invention is one, any or all of prior embodiments in this paragraph up through the first embodiment in this paragraph wherein the hydrophilic ionomeric polymer is converted from a water-soluble hydrophilic ionomeric polymer. An embodiment of the invention is one, any or all of prior embodiments in this paragraph up through the first embodiment in this paragraph wherein the water-soluble hydrophilic ionomeric polymer is a negatively charged polysaccharide polymer, a positively charged polysaccharide polymer, or combinations thereof. An embodiment of the invention is one, any or all of prior embodiments in this paragraph up through the first embodiment in this paragraph wherein the negatively charged polysaccharide polymer comprises sodium alginate, potassium alginate, calcium alginate, ammonium alginate, sodium hyaluronate, potassium hyaluronate, calcium hyaluronate, ammonium hyaluronate, κ-carrageenan, λ-carrageenan, τ-carrageenan, pectin, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, or combinations thereof. An embodiment of the invention is one, any or all of prior embodiments in this paragraph up through the first embodiment in this paragraph wherein the positively charged polysaccharide polymer is protonated chitosan.

A second embodiment of the invention is a method of preparing an ionically conductive asymmetric composite membrane comprising applying a layer of an aqueous solution comprising a water-soluble hydrophilic ionomeric polymer to one surface of a microporous substrate membrane; drying the coated membrane to form an ionically conductive composite membrane comprising a nonporous water-soluble hydrophilic ionomeric polymer coating layer on the microporous substrate membrane; converting the nonporous water-soluble hydrophilic ionomeric polymer coating layer into an asymmetric hydrophilic ionomeric polymer coating layer comprising a porous layer with a nonporous layer on top. An embodiment of the invention is one, any or all of prior embodiments in this paragraph up through the second embodiment in this paragraph wherein converting the nonporous water-soluble hydrophilic ionomeric polymer coating layer comprises simultaneously contacting the nonporous water-soluble hydrophilic ionomeric polymer coating layer with a positive electrolyte solution having a pH of 1.5 or lower and contacting the microporous substrate membrane with a negative electrolyte solution having a pH greater than or equal to the pH of the positive electrolyte solution forming the porous layer with the nonporous layer. An embodiment of the invention is one, any or all of prior embodiments in this paragraph up through the second embodiment in this paragraph wherein at least one of a contacting time is in a range of 10 min to 10 h, and a contacting temperature is in a range of 10° C. to 60° C. An embodiment of the invention is one, any or all of prior embodiments in this paragraph up through the second embodiment in this paragraph wherein the aqueous solution comprises an inorganic acid or an organic acid. An embodiment of the invention is one, any or all of prior embodiments in this paragraph up through the second embodiment in this paragraph wherein the inorganic acid is HCl, $H_2SO_4$, or $H_3PO_4$. An embodiment of the invention is one, any or all of prior embodiments in this paragraph up through the second embodiment in this paragraph wherein the organic acid is acetic acid or lactic acid. An embodiment of the invention is one, any or all of prior embodiments in this paragraph up through the second embodiment in this paragraph wherein the water-soluble hydrophilic ionomeric polymer is a negatively charged polysaccharide polymer, a positively charged polysaccharide polymer, or combinations thereof. An embodiment of the invention is one, any or all of prior embodiments in this paragraph up through the second embodiment in this paragraph wherein the negatively charged polysaccharide polymer comprises sodium alginate, potassium alginate, calcium alginate, ammonium alginate, sodium hyaluronate, potassium hyaluronate, calcium hyaluronate, ammonium hyaluronate, κ-carrageenan, λ-carrageenan, τ-carrageenan, pectin, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, or combinations thereof. An embodiment of the invention is one, any or all of prior embodiments in this paragraph up through the second embodiment in this paragraph wherein the positively charged polysaccharide polymer is protonated chitosan.

A third embodiment of the invention is a redox flow battery system, comprising at least one rechargeable cell comprising a positive electrolyte, a negative electrolyte, and an ionically conductive asymmetric composite membrane positioned between the positive electrolyte and the negative electrolyte, the positive electrolyte in contact with a positive electrode, and the negative electrolyte in contact with a negative electrode, wherein the ionically conductive asymmetric composite membrane comprises a microporous substrate membrane with an asymmetric hydrophilic ionomeric polymer coating layer thereon, wherein the coating layer made of a hydrophilic ionomeric polymer, wherein the coating layer comprises a porous layer with a nonporous layer thereon, and wherein the microporous substrate membrane is made from a polymer different from the hydrophilic ionomeric polymer; the positive electrolyte consisting essentially of $FeCl_2$ at a concentration of 1.0-4.5 M, $NH_4Cl$ at a concentration of 1.0-4.0 M or KCl at a concentration of 1.0-3.0 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; and the negative electrolyte consisting essentially of $FeCl_2$ at a concentration of 1.0-4.5 M, $NH_4Cl$ at a concentration of 1.0-4.0 M or KCl at a concentration of 1.0-3.0 M, optionally boric acid at a concentration of 0.01-1.0 M, optionally glycine at a concentration of 0.01-3.0 M, and optionally $FeCl_3$ at a concentration of 0.1-1.0 M. An embodiment of the invention is one, any or all of prior embodiments in this paragraph up through the third embodiment in this paragraph wherein the hydrophilic ionomeric polymer comprises alginic acid, hyaluronic acid, carrageenic acid, chitosan, pectinic acid, pectic acid, carboxymethyl curdlan, carboxymethyl cellulose acid, dextran, pullulan, chitin, chondroitin, xanthan gum, or combinations thereof.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. An ionically conductive asymmetric composite membrane comprising:
   a microporous substrate membrane; and
   an asymmetric hydrophilic ionomeric polymer coating layer on a surface of the microporous substrate layer, the coating layer made of a hydrophilic ionomeric polymer, the coating layer comprising;
      a porous layer having a first surface and a second surface, the first surface of the porous layer on the surface of the microporous substrate layer; and
      a nonporous layer on the second surface of the porous layer;
   wherein the microporous substrate membrane is made from a polymer different from the hydrophilic ionomeric polymer.

2. The composite membrane of claim 1 wherein the hydrophilic ionomeric polymer comprises a polysaccharide polymer, a poly(acrylic acid) polymer, a poly(methacrylic acid) polymer, or combinations thereof.

3. The composite membrane of claim 2 wherein the hydrophilic ionomeric polymer comprises the polysaccharide polymer, and wherein the polysaccharide polymer comprises chitosan, alginic acid, hyaluronic acid, dextran, pullulan, carboxymethyl curdlan, κ-carrageenan, μ-carrageenan, τ-carrageenan, carboxymethyl cellulose acid, pectic acid, chitin, chondroitin, xanthan gum, or combinations thereof.

4. The composite membrane of claim 3 wherein the polysaccharide polymer comprises alginic acid, hyaluronic acid, carrageenic acid, or combinations thereof.

5. The composite membrane of claim 1 wherein the microporous substrate membrane comprises polyethylene, polypropylene, polyamide, polyacrylonitrile, polyethersulfone, sulfonated polyethersulfone, polysulfone, sulfonated polysulfone, poly(ether ether ketone), sulfonated poly(ether ether ketone), polyester, cellulose acetate, cellulose triacetate, polybenzimidazole, polyimide, polyvinylidene fluoride, polycarbonate, cellulose, or combinations thereof.

6. The composite membrane of claim 1 wherein the hydrophilic ionomeric polymer is converted from a water-soluble hydrophilic ionomeric polymer.

7. The composite membrane of claim 6 wherein the water-soluble hydrophilic ionomeric polymer is a negatively charged polysaccharide polymer, a positively charged polysaccharide polymer, or combinations thereof.

8. The composite membrane of claim 7 wherein the negatively charged polysaccharide polymer comprises sodium alginate, potassium alginate, calcium alginate, ammonium alginate, sodium hyaluronate, potassium hyaluronate, calcium hyaluronate, ammonium hyaluronate, κ-carrageenan, λ-carrageenan, τ-carrageenan, pectin, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, or combinations thereof.

9. The composite membrane of claim 7 wherein the positively charged polysaccharide polymer is protonated chitosan.

10. A method of preparing an ionically conductive asymmetric composite membrane comprising:
    applying a layer of an aqueous solution comprising a water-soluble hydrophilic ionomeric polymer to one surface of a microporous substrate membrane;
    drying the coated membrane to form an ionically conductive composite membrane comprising a nonporous water-soluble hydrophilic ionomeric polymer coating layer on the microporous substrate membrane; and
    converting the nonporous water-soluble hydrophilic ionomeric polymer coating layer into an asymmetric hydrophilic ionomeric polymer coating layer comprising a porous layer with a nonporous layer on top; wherein the microporous substrate membrane is made from a polymer different from the hydrophilic ionmeric polymer.

11. The method of claim 10 wherein converting the nonporous water-soluble hydrophilic ionomeric polymer coating layer comprises:
    simultaneously contacting the nonporous water-soluble hydrophilic ionomeric polymer coating layer with a positive electrolyte solution having a pH of 1.5 or lower and contacting the microporous substrate membrane with a negative electrolyte solution having a pH greater than or equal to the pH of the positive electrolyte solution forming the porous layer with the nonporous layer.

12. The method of claim 11 wherein at least one of: a contacting time is in a range of 10 min to 10 h, and a contacting temperature is in a range of 10° C. to 60° C.

13. The method of claim 10 wherein the aqueous solution comprises an inorganic acid or an organic acid.

14. The method of claim 13 wherein the inorganic acid is HCl, $H_2SO_4$, or $H_3PO_4$.

15. The method of claim 13 wherein the organic acid is acetic acid or lactic acid.

16. The method of claim 10 wherein the water-soluble hydrophilic ionomeric polymer is a negatively charged polysaccharide polymer, a positively charged polysaccharide polymer, or combinations thereof.

17. The method of claim 16 wherein the negatively charged polysaccharide polymer comprises sodium alginate, potassium alginate, calcium alginate, ammonium alginate, sodium hyaluronate, potassium hyaluronate, calcium hyaluronate, ammonium hyaluronate, κ-carrageenan, λ-carrageenan, τ-carrageenan, pectin, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, or combinations thereof.

18. The method of claim 16 wherein the positively charged polysaccharide polymer is protonated chitosan.

19. A redox flow battery system, comprising:
   at least one rechargeable cell comprising a positive electrolyte, a negative electrolyte, and an ionically conductive asymmetric composite membrane positioned between the positive electrolyte and the negative electrolyte, the positive electrolyte in contact with a positive electrode, and the negative electrolyte in contact with a negative electrode, wherein the ionically conductive asymmetric composite membrane comprises a microporous substrate membrane with an asymmetric hydrophilic ionomeric polymer coating layer thereon, wherein the coating layer made of a hydrophilic ionomeric polymer, wherein the coating layer comprises a porous layer with a nonporous layer thereon, and wherein the microporous substrate membrane is made from a polymer different from the hydrophilic ionomeric polymer;
   the positive electrolyte consisting essentially of $FeCl_2$ at a concentration of 1.0-4.5 M, $NH_4Cl$ at a concentration of 1.0-4.0 M or KCl at a concentration of 1.0-3.0 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; and
   the negative electrolyte consisting essentially of $FeCl_2$ at a concentration of 1.0-4.5 M, $NH_4Cl$ at a concentration of 1.0-4.0 M or KCl at a concentration of 1.0-3.0 M, optionally boric acid at a concentration of 0.01-1.0 M, optionally glycine at a concentration of 0.01-3.0 M, and optionally $FeCl_3$ at a concentration of 0.1-1.0 M.

20. The redox flow battery system of claim 19 wherein the hydrophilic ionomeric polymer comprises alginic acid, hyaluronic acid, carrageenic acid, chitosan, pectinic acid, pectic acid, carboxymethyl curdlan, carboxymethyl cellulose acid, dextran, pullulan, chitin, chondroitin, xanthan gum, or combinations thereof.

\* \* \* \* \*